Patented Aug. 22, 1950

2,519,797

UNITED STATES PATENT OFFICE 2,519,797

SESQUICYANINES

Douglas William Stammers, Blackley, Manchester, England, assignor to Imperial Chemical Industries Limited, a corporation of Great Britain No Drawing. Application July 18, 1945, Serial No. 605,833. In Great Britain August 21, 1944

6 Claims. (Cl. 260—240.1)

The present invention relates to the manufacture of new sesquicyanines, more particularly sesquicyanines which are characterised by containing at least one 1:5-phenanthroline nucleus. The new compounds are useful as photographic sensitisers and this application is a further feature of the invention.

Sesquicyanines can be regarded as compounds exhibiting a structure composed of three heterocyclic nitrogen nuclei, one of which is in the form of a quaternary salt, each being joined to a central carbon atom by a methine link attached in the position α— or γ— to the nitrogen atom. I have now found that new sesquicyanines characterised in that at least one of the three nuclei is a 1:5-phenanthroline nucleus linked in the 2-position, are eminently fitted to serve as photographic sensitisers.

According to the invention new sesquicyanines are manufactured by a process comprising condensing a trimethine cyanine compound, carrying in the meso or β-methine group an alkyl substituent, with a quaternary salt of a heterocyclic nitrogen compound bearing in the α- or γ-position to the nitrogen atom a substituent being alkylmercapto, aralkylmercapto, arylmercapto, or halogeno, the before mentioned trimethine cyanine compound and heterocyclic nitrogen compound being such that the resultant sesquicyanine contains at least one 1:5-phenanthroline nucleus which is joined in the 2-position by a methine link to the central carbon atom.

It will be apparent from what has been said above that the present new sesquicyanines may contain one, two or three 1:5-phenanthroline nuclei. Thus the trimethine cyanine compound may be symmetrical or unsymmetrical. For instance, (3-ethylbenzthiazole-2)-(3-ethylbenzoxazole-2)-meso-methyltrimethine cyanine iodide may be condensed with 2-methylmercapto-1:5-phenanthroline ethyl p-toluene sulphonate. The resulting sesquicyanine contains one benzthiazole nucleus, one benzoxazole nucleus and one 1:5-phenanthroline nucleus. Further, bis(N-ethylbenzthiazole-2)-meso-methyltrimethine cyanine iodide can be condensed with 2-methylmercapto-1:5-phenanthroline ethyl p-toluene sulphonate. In this manner a sesquicyanine with two benzthiazole nuclei and one 1:5-phenanthroline nucleus is produced.

The trimethine cyanine compounds containing one or two 1:5-phenanthroline nuclei may be made, as described in copending application Serial No. 602,169, by condensing a quaternary salt of a heterocyclic nitrogen compound bearing in the α- or γ-position to the quaternary nitrogen atom a β-alkylmercapto-β-alkylvinyl grouping with a heterocyclic nitrogen compound containing a methyl group in the α or γ position to a quaternary nitrogen atom, one or both of said heterocyclic nitrogen compounds being a 1:5-phenanthroline derivative.

Other phenanthroline quaternary salts which may be condensed with meso-alkyltrimethine cyanine compounds are, for example, 2-methylmercapto-1:5-phenanthroline methyl p-toluene sulphonate (obtainable as described in my co-pending application Serial No. 602,169)

2-iodo-1:5-phenanthroline ethiodide (obtained as described in the Journal of the Chemical Society, 1942, pages 213–218) or (provided the trimethine cyanine compound already contains at least one 1:5-phenanthroline nucleus)

2-methylmercaptoquinoline methiodide 2-methylmercapto-2':1'-naphthathiazole ethiodide 2-methylmercaptobenzthiazole ethyl p-toluene sulphonate.

Examples of suitable trimethine cyanine compounds, i. e. such as contain an alkyl substituent on the central carbon atom of the trimethine chain, besides the two mentioned above, are:

(3-ethylbenzselenazole-2)(3-ethylbenzthiazole-2)-meso-methyltrimethine cyanine iodide bis-(3 - β - hydroxyethylbenzthiazole-2)-meso-ethyltrimethine cyanine iodide (1-ethylquinoline - 2)(N-ethylbenzthiazole-2)-meso-methyltrimethine cyanine p-toluene sulphonate (N-methyl - β - naphthathiazole-2)(N-methylbenzoxazole)-meso - methyltrimethine cyanine iodide bis-(3 - β - hydroxyethylbenzthiazole-2)meso-methyltrimethine cyanine iodide.

Such trimethine cyanine compounds are obtainable by processes which are described in British specifications Nos. 412,309, 537,961, 538,875 and 553,264 (vide line 57 et seq. of p. 5).

The condensations according to the present invention are conveniently effected in the presence of an acid-binding agent, e. g. pyridine (useful also as a medium for the reaction when employed in sufficient quantity) or often better as being a stronger base, triethanolamine or triethylamine. Inorganic acid-binders may also be used, e. g. sodium carbonate.

A further feature of this invention lies in the incorporation of the new sesquicyanines as sensitisers in photographic silver halide emulsions.

The present new sesquicyanines may be incorporated in the photographic emulsion to be sensitised by any process known in the art. For example, solutions of the new sesquicyanines in a solvent compatible with the emulsions, e. g. methanol or acetone, may be mixed slowly with the molten washed gelatino-silver halide emulsion until the sesquicyanine is uniformly distributed throughout the emulsion. Or else, for instance, a photographic emulsion with which a support, e. g. a glass plate, or film base, has been coated, may be sensitised by bathing the coated support in a solution of the sesquicyanine.

The following examples illustrate but are not intended to limit the invention.

Example 1

0.6 gram of (3-ethyl-benzthiazole-2)(3-ethyl-benzoxazole-2)-meso-methyltrimethine cyanine iodide and 0.696 gram of 2-methylmercapto-1:5-phenanthroline ethyl p-toluene sulphonate (obtainable as described in our copending application Serial No. 602,169) are dissolved in 6 ccs. of pyridine containing 0.69 cc. of triethylamine. The mixture is boiled under reflux for one hour. After cooling the crude new sesquicyanine is precipitated by the addition of ether and is purified by washing with water and recrystallisation from methanol. The new compound then consists of small bright green needles melting at 218° C. after preliminary softening.

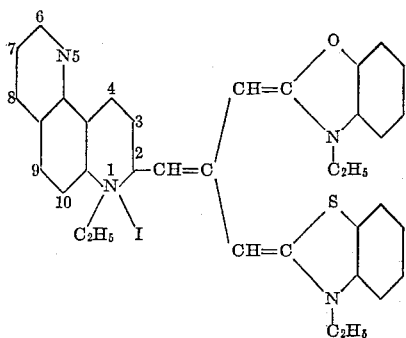

Example 2

0.95 gram of bis(N-ethylbenzthiazole-2)-meso-methyltrimethine cyanine iodide and 1.065 gms. of 2-methylmercapto-1:5-phenanthroline ethyl p-toluene sulphonate are dissolved in 10 ccs. of dry pyridine containing 1.0 cc. of triethylamine. The mixture is heated at the boil under reflux for one hour. After cooling and dilution with ether the new sesquicyanine separates as an oil which solidifies when washed with cold water. The crude product is recrystallised twice from methanol and then consists of golden yellow plate-like crystals, melting at 230° C. after sintering at 210° C.

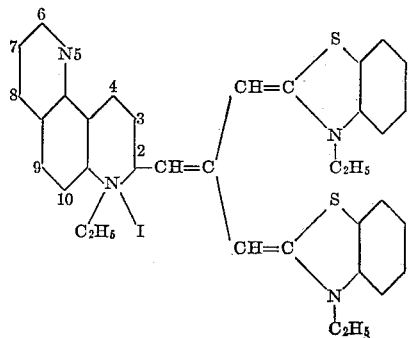

I claim:

1. The new sesquicyanine dyes of the formula:

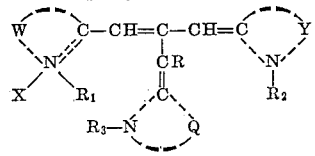

where $R_1$, $R_2$, and $R_3$ are alkyl radicals, X is the negative radical of an acid, W, Q, and Y constitute the atoms necessary to complete a heterocyclic nucleus selected from the group consisting of 1:5-phenanthroline, benzthiazole and benzoxazole, at least one of the symbols W, Q, and Y representing the atoms necessary to complete a 1:5-phenanthroline nucleus which is linked to the acyclic chain of atoms in the 2-position of said phenanthroline nucleus, and R is a member taken from the group consisting of hydrogen and alkyl radicals.

2. The new sesquicyanine dyes of the formula:

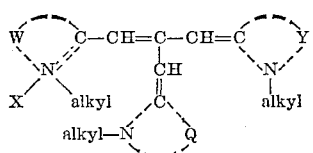

where W, Q, and Y represent the atoms necessary to complete a heterocyclic nucleus selected from the group consisting of 1:5-phenanthroline, benzthiazole and benzoxazole, at least one of the symbols W, Q, and Y representing the atoms necessary to complete a 1:5-phenanthroline nucleus which is joined to the acyclic conjugated chain of atoms in the 2-position of said 1:5-phenanthroline nucleus and where X is the negative radical of an acid.

3. A sesquicyanine dye of the formula:

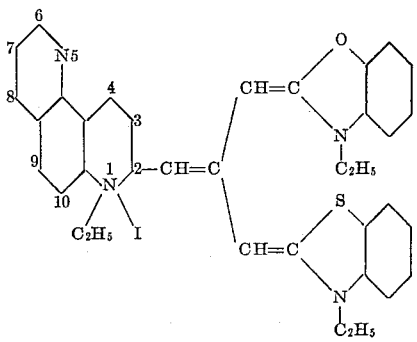

4. A sesquicyanine dye of the formula:

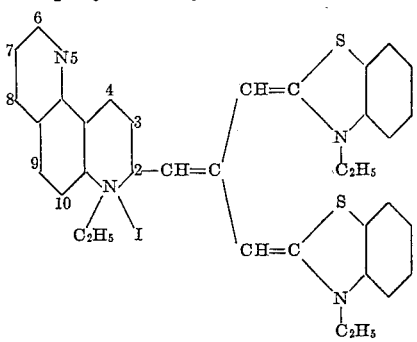

5. The process which comprises condensing a mesoalkyl substituted cyanine dye of the formula:

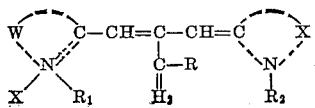

with a cyclammonium salt of the formula:

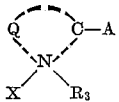

wherein X is the negative radical of an acid, W, Q, and Y represent the atoms necessary to complete a heterocyclic nucleus selected from the group consisting of 1:5-phenanthroline, benzthiazole and benzoxazole, at least one of which is a 1:5-phenanthroline nucleus, R is a member taken from the group consisting of hydrogen and alkyl, $R_1$, $R_2$, $R_3$ are alkyl radicals, and A is a member taken from the group consisting of hydrocarbon mercapto and halogen.

6. The process which comprises condensing a mesoalkyl substituted cyanine dye of the formula:

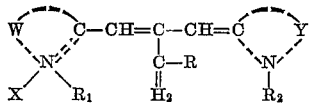

with a cyclammonium salt of the formula:

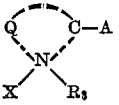

where X is the negative radical of an acid, W, Q, and Y represent the atoms to complete a heterocyclic nucleus selected from the group consisting of 1:5 phenanthroline, benzthiazole and benzoxazole, at least one of which is a 1:5-phenanthroline nucleus, R is a member taken from the group consisting of hydrogen and alkyl, $R_1$, $R_2$, $R_3$ are alkyl radicals, and A is a member taken from the group consisting of hydrocarbon mercapto and halogen in the presence of an acid binding agent.

DOUGLAS WILLIAM STAMMERS.

REFERENCES CITED

The following references are of record in the file of this patent:

UNITED STATES PATENTS

| Number | Name | Date |
|---|---|---|
| 2,104,855 | Dieterle | Jan. 11, 1938 |
| 2,185,798 | Stevens | Jan. 2, 1940 |